United States Patent
Marr et al.

(10) Patent No.: US 9,684,148 B2
(45) Date of Patent: Jun. 20, 2017

(54) PRIMARY MIRROR MOUNT ASSEMBLY AND METHOD

(71) Applicant: RAYTHEON COMPANY, Waltham, MA (US)

(72) Inventors: Lyale F. Marr, Richardson, TX (US); Randy W. White, Greenville, TX (US); Richard L. Scott, The Colony, TX (US); James L. Dean, Denison, TX (US)

(73) Assignee: RAYTHEON COMPANY, Waltham, MA (US)

( * ) Notice: Subject to any disclaimer, the term of this patent is extended or adjusted under 35 U.S.C. 154(b) by 319 days.

(21) Appl. No.: 14/290,720

(22) Filed: May 29, 2014

(65) Prior Publication Data

US 2015/0346456 A1    Dec. 3, 2015

(51) Int. Cl.
  *G02B 7/182* (2006.01)
  *B23K 26/20* (2014.01)
  *G02B 7/183* (2006.01)

(52) U.S. Cl.
  CPC .............. *G02B 7/182* (2013.01); *B23K 26/20* (2013.01); *G02B 7/183* (2013.01)

(58) Field of Classification Search
  CPC ....... G02B 7/182; B02B 7/183; H01L 21/027; F16M 11/00
  See application file for complete search history.

(56) References Cited

U.S. PATENT DOCUMENTS

| 4,776,670 A | 10/1988 | Kessels et al. |
| 2006/0187558 A1 | 8/2006 | Kassenaar |
| 2012/0140328 A1* | 6/2012 | Kwan ................. G03F 7/70858 359/572 |
| 2013/0050862 A1* | 2/2013 | Someya ................. G02B 7/181 359/871 |
| 2013/0208367 A1* | 8/2013 | Thomas ................. G02B 7/008 359/732 |
| 2013/0314813 A1 | 11/2013 | Vidal et al. |

FOREIGN PATENT DOCUMENTS

| JP | 2008096649 A | 4/2008 |
| JP | 2010164379 A | 7/2010 |
| JP | 2010262026 A | 11/2010 |
| JP | 2013106017 A | 5/2013 |

OTHER PUBLICATIONS

Extended European Search Report from corresponding European Application No. 1516958907 dated Mar. 30, 2016.

* cited by examiner

*Primary Examiner* — Jacob Cigna
*Assistant Examiner* — Lee A Holly
(74) *Attorney, Agent, or Firm* — Lando & Anastasi, LLP

(57) ABSTRACT

A primary mirror mount assembly includes a body including a mirror surface and a mount surface, with the mount surface having at least one feature formed therein. The mount assembly further includes a hub configured to be secured to the body. The hub includes at least one corresponding mating feature configured to receive the at least one feature of the mount surface of the body therein. The at least one feature and the at least one corresponding mating feature are configured to be welded together. A method of assembling a primary mirror mount assembly is further disclosed.

7 Claims, 8 Drawing Sheets

PRIMARY MIRROR MOUNT ASSEMBLY AND METHOD

BACKGROUND OF THE DISCLOSURE

Current practice for fabricating metal mirrors is to machine the mirror from a single raw billet or forging. In one embodiment, the optical surfaces of an aluminum mirror could be machined as two-pieces, which are brazed together, and then mated with a thermal shrink fit hub. With such mirrors, it is challenging to properly install the hub into the mirror before a thermal equilibrium between the mating parts is achieved. A majority of larger diameter (e.g., greater than ten inches diameter) monolithic metal mirrors, when employed in military environments, require the use of adhesives to restrain against highly dynamic shear loads. Required fastener clamping loads, adequate to resist such shear forces, exceed the allowable bolt-up strain limits (few millionths of an inch) for the mirror's surface figure.

Achieving diffraction limited optical performance, from telescopes employing such mirrors, typically dictates mirror misalignments not exceed one ten thousandth of an inch. Achieving adequate load capacity to guarantee such alignment registration, for large mirrors exposed to shock loads, results in design, fabrication, and assembly challenges. For this application, the common usage of interference-fit fasteners, like pins, for restraining against shear loads is also problematic. Significant stress levels, generated with press-fit pins, propagate through materials generating strains. Unlike many typical machine parts, the optical performance of mirrors, subjected to strains greater than several millionths of an inch on their reflective surfaces, are significantly degraded. Thus, a need exists for a mirror mount assembly that is configured to provide precision registration for large diameter metal mirrors, during exposure to high shear loads (e.g., greater than 26 Gs), without stressing the optical surface of the mirror.

SUMMARY OF THE DISCLOSURE

One aspect of the present disclosure is directed to a primary mirror mount assembly comprising a body including a mirror surface and a mount surface, with the mount surface having at least one feature formed therein. The mount assembly further comprises a hub configured to be secured to the body. The hub includes at least one corresponding mating feature configured to receive the at least one feature of the mount surface of the body therein. The at least one feature and the at least one corresponding mating feature are configured to be welded together.

Embodiments of the mount assembly further may include a weld washer positioned on the boss within the opening of the tab when positioning the tab on the boss. The weld washer and the tab may be welded to the boss. The body may include a threaded opening formed in the raised portion next to the boss, and the tab may include a smaller opening formed therein, with the smaller opening corresponding to the threaded opening when positioning the tab on the boss. The mount assembly further may include a screw received within the smaller opening and secured within the threaded opening of the raised portion. The body may include a relief formed in the body behind the raised portion. The at least one feature of the body and the at least one corresponding mating feature of the hub may include three features and mating features. The hub may include an outer flange portion and an annular, inner hub portion. The at least one feature of the mount surface of the body may include an annular recess configured to receive the inner hub portion of the hub, to seat the hub. The at least one feature of the mount surface of the body further may include a raised portion formed in the recess, with the raised portion having a boss formed on the raised portion. The at least one corresponding mating feature of the hub may include a tab extending radially inwardly from the inner hub portion of the hub. The tab may include an opening formed therein, the opening being sized to receive the boss of the body therein.

Another aspect of the disclosure is directed to a method of assembling a primary mirror. In one embodiment, the method comprises: aligning at least one feature formed on a mount surface of a body with at least one corresponding mating feature formed on a hub; positioning the hub within a recess formed in a mount surface of the body so that the at least one feature formed on the body engages the at least one mating feature of the hub; welding the at least one feature of the mount surface of the body to the at least one corresponding mating feature of the hub; and finishing a mirror surface of the body after welding.

Embodiments of the method further may include positioning a weld washer around the boss prior to welding the at least one feature of the mount surface of the body to the at least one corresponding mating feature of the hub. The method further may include securing the hub to the body with a screw. The method further may include forming a relief under the raised portion of the at least one feature. Aligning the at least one feature of the body with the at least one mating feature of the hub further may include aligning a tab of the at least one mating feature with a raised portion of the at least one feature. Aligning the at least one feature of the body with the at least one mating feature of the hub further may include aligning an opening of the tab of the at least one mating feature with a boss formed on the raised portion of the at least one feature. Welding the at least one feature of the body to the at least one corresponding mating feature of the hub may include laser welding.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description, or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION OF THE PREFERRED EMBODIMENTS

Embodiments of the disclosure described herein provide an assembly and a method of mounting a mirror blank to a hub, which is used to support the primary mirror during final stages of fabrication, as well as in tactical military operations. As mentioned above, there is a need for a mirror mount assembly that is configured to mount and retain critical registration of large diameter metal mirrors, when exposed to high shear loads (e.g., greater than 26 Gs), without stressing the optical surface of the mirror. The assemblies and methods disclosed herein incorporate features that are specifically designed to be laser welded together to rigidly secure the mirror blank to the hub while enabling the optical surface of the mirror to be finished by techniques such as diamond point turning and subsequent polishing steps. This multi-piece design also facilitates the decoupling of the optical surface for both fabrication and subsequent rigid mounting of the mirror.

Figure 1:
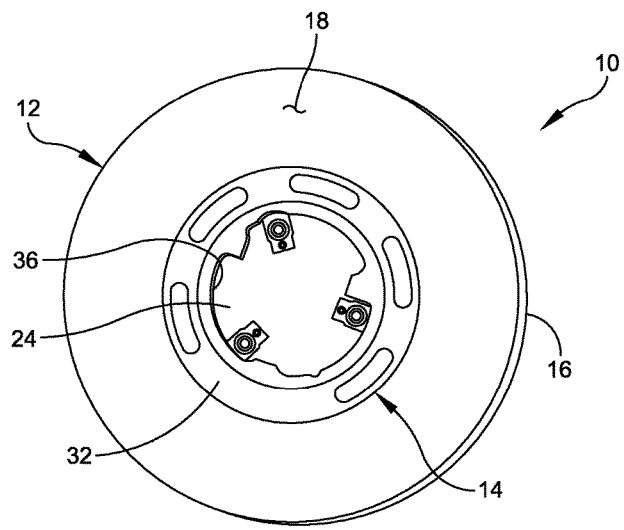
FIG. 1 is a top plan view of a primary mirror mount assembly of an embodiment of the present disclosure.
Figure 2:
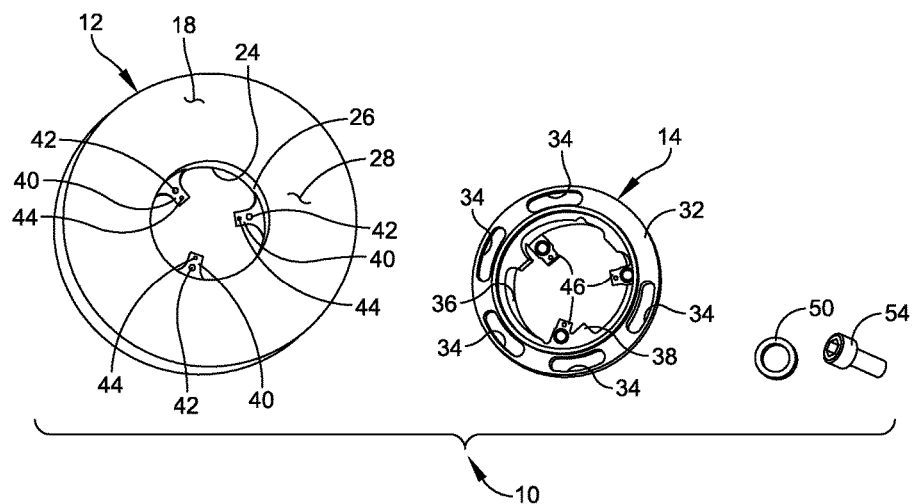
FIG. 2 is a top perspective view of the primary mirror mount assembly shown in FIG. 1 with component parts of the assembly being disassembled.

Turning now to the drawings, and more particularly to FIGS. 1 and 2, a primary mirror mount assembly is generally indicated at 10. As shown, the primary mirror mount assembly includes a relatively large circular body (sometimes referred to as a "mirror blank"), generally indicated at 12, and a smaller hub, generally indicated at 14, that secures the body to a suitable support structure, like an optical housing.

Figure 11:
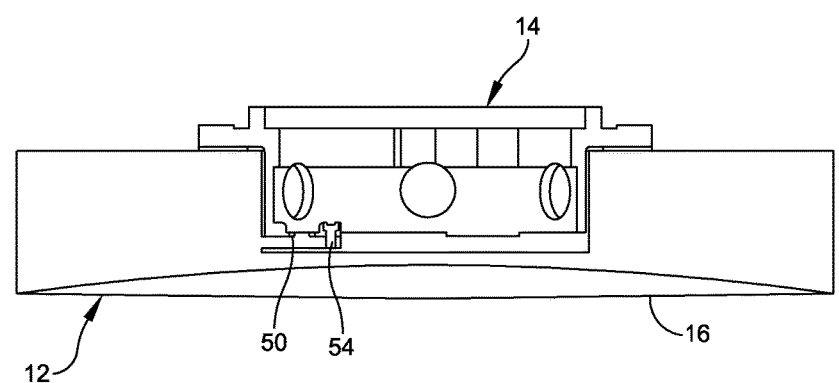
FIG. 11 is a cross-sectional view of the primary mount assembly illustrating an optical surface curvature.

In one embodiment, the body 12 is a blank fabricated from a suitable alloy, such as 6061 aluminum. However, other suitable metals and alloys may be selected depending on the intended use. The body 12 includes a front mirrored or optical surface 16 and a back structural surface 18, as indicated in cross section in FIG. 11. The back structural surface 18 is depicted as a solid cylinder; however, a multitude of geometries could be machined in the back to optimize various parameters, such mirror stiffness or thermal uniformity as a function of design considerations such as gravity-induced sag, thermal gradients, or producibility.

As described below, the mirrored surface 16 is finished (e.g., by diamond point turning, polishing, or other suitable process) after the body 12 is secured to the hub 14 with a laser welding process. This fabrication sequence facilitates the ability to thermally stress relief both the laser welded joints and other internal stresses in the mirror resulting from all previous fabrication processes. Relieving internal stresses in the mirror prior to the optical surface finishing, enhances the dimensional stability of the mirror.

Prior to the laser welding, the back surface 18 of the body 12 also is machined to include a central annular recess 24, which is configured to interface with the hub 14. As shown, the recess 24 is defined by a peripheral wall 26, which transitions to a machined surface 28 which is perpendicular to the peripheral wall.

Figure 3:
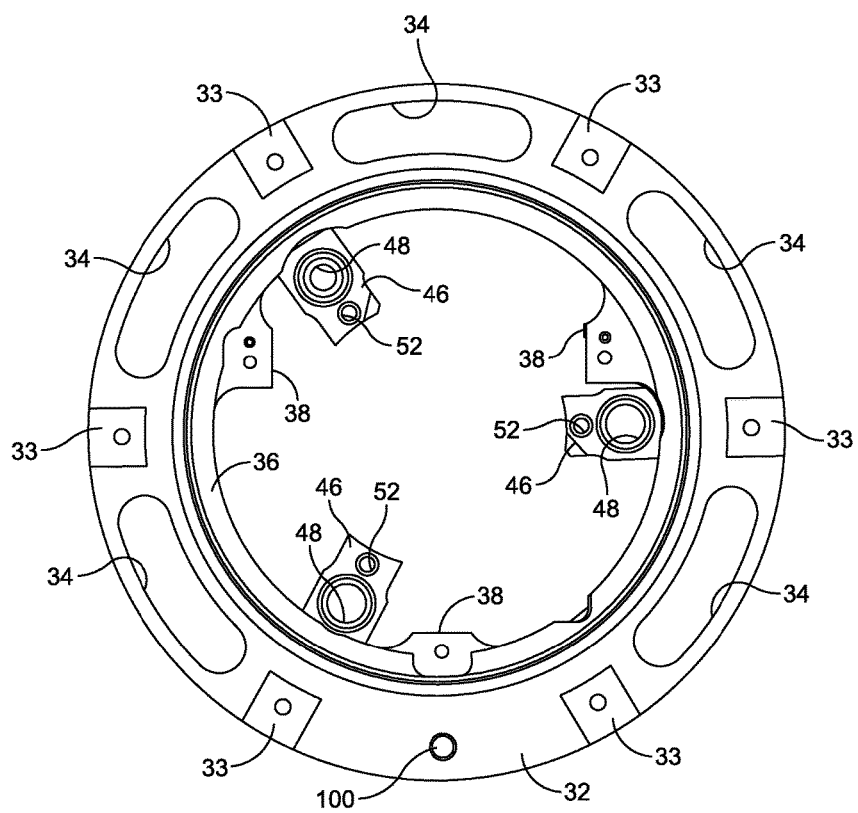
FIG. 3 is an enlarged top plan view of a mounting hub of the primary mirror mount assembly.

Referring additionally to FIG. 3, in one embodiment, the hub 14 is fabricated from a suitable alloy that is compatible with the material of the body 12, e.g., 6061 aluminum. As shown, the hub 14 includes an outer flange portion 32 having six coplanar pads, each indicated at 33, and five slots, each indicated at 34, formed therein. The slots 34 serve to both reduce the overall weight of the mirror assembly and selectively tune the stiffness of the flange portion 32. The desired flange stiffness is dictated by competing requirements. The outer flange portion 32 of the hub 14 further includes the dowel pin 100, which functions as a mirror clocking pin.

It is desirable to have a stiff flange to increase the overall natural frequency of the mirror assembly 10. The higher the natural frequency, the lower the amplitude of the vibrations coupled into the mirror surface 16, when exposed to externally-induced vibrations. Vibrations and shock disturbances imposed on the mirror dynamically degrade an optical surface figure, resulting in degraded optical wave fronts, which translate into smeared image quality.

The competing aspiration regarding flange stiffness is to increase compliance between the flange portion 32 and the mirror optical surface 16. Any planarity errors between the pads 33 and mating pads on a telescope housing also create stress and resulting strain on the flange. This additional stress must be attenuated to minimize its degrading strain on the optical surface figure of the mirror.

The hub 14 further includes an inner cylindrical portion 36 that aligns concentric with the peripheral wall 26 of recess 24, when the hub is mounted on the body 12. Thus, a diameter of the recess 24 of the body 12 is slightly larger than a diameter of the inner hub portion 36 of the hub 14 so that the inner hub portion 36 fits within the recess. The inner hub portion 36 is integrally formed with the outer flange portion 32, and includes several mounting features to secure the hub 14 to corresponding mounting features associated with the body 12. In addition, the inner cylindrical portion 36 may be contoured at an inner circumferential edge 38 to facilitate securing other instruments or sensors to the mirror assembly.

As will be described in greater detail below, the body 12 and the hub 14 are welded, e.g., laser welded, to one another to achieve a structurally robust and low-cost technique to produce large multi-piece aluminum mirrors. When secured to one another by welding, the result is an all-aluminum, integral, mirror-to-mount joint, which significantly decouples straining the optical surface of the mirror. The all-aluminum joint design eliminates potential issues with thermal expansion instability, while facilitating multi-part design capabilities to produce complex geometries not achievable with single part construction. The highly localized laser welds result in almost indiscernible effect on adjacent material, providing consistent strength properties, which can be rapidly fabricated. Laser welding provides consistent joint construction, with minimal thermal distortion and at low unit cost, which is structurally superior to any adhesively-bonded joint. While laser welding is an optimal process, any suitable welding technique may be employed to secure the hub 14 to the body 12. Laser welding does not introduce thermal distortion issues while facilitating multi-part design options. Laser welding decouples the mirror optical surface from the hub 14 to provide desensitized bolt-up, while facilitating radial interference joints between the hub and the mirror housing, for robust shear load capability.

The body 12 of the mount assembly 10 further includes three mounting features formed within the recess 24. In one embodiment, the three mounting features include cantilevered tabs, each indicated at 40, spaced equidistant from one another adjacent the peripheral wall 26 defining the recess 24. Although shown and described as being equidistant from one another, the tabs 40 can be spaced at reasonable distances from one another. Each tab 40 includes a cylindrical boss 42 projecting upwardly from the raised portion and a threaded opening 44 positioned inboard on the tab, with respect to the boss. The hub 14 includes three mating mounting features provided on the inner cylindrical portion 36 of the hub. In one embodiment, the three mating mounting features of the hub 14 include tabs, each indicated at 46, extending radially inwardly from the inner cylinder 36 of the hub. Each tab 46 includes an opening 48 formed therein, which is sized to receive the boss 42 of the body 12 therein when aligning the tabs of the hub 14 with the tabs 40 of the body. In a certain embodiment, a weld washer 50 is inserted over the boss 42 prior to aligning and positioning the hub 14 within the recess 24 of the body 12. The weld washer 50 is provided to facilitate the attachment of the hub 14 to the body 12. In one embodiment, the weld washer is fabricated from 4047 aluminum to prevent cracking the 6061 aluminum during the laser weld process. It is commonly understood by laser welders that an alloy like 4047 or 4043 is vital to successfully laser welding 6061 aluminum.

Each tab 46 further includes a smaller opening 52 positioned at a free end of the tab. When the boss 42, provided on the tab 40, of the body 12 is received within the opening 48 of the tab 46, of the hub 14, the smaller opening 52 of the tab is aligned with the threaded opening 44 of the body. As shown, a screw 54 is also provided to initially secure the hub 14 to the body 12. In one embodiment, the screw 54 is a socket head cap screw that has threads compatible with the threads of the threaded opening 44. The arrangement is such that when positioning the inner cylinder 36 of the hub 14 within the recess 24 of the body 12, and inserting the bosses 42 within their respective openings 48 of the tabs 46, the screw 54 may be used to position the hub with respect to the body. The screw 54 may be firmly tightened once the hub 14 is accurately positioned with respect to the body 12 to facilitate proper registration of parts during laser welding.

Figure 4:
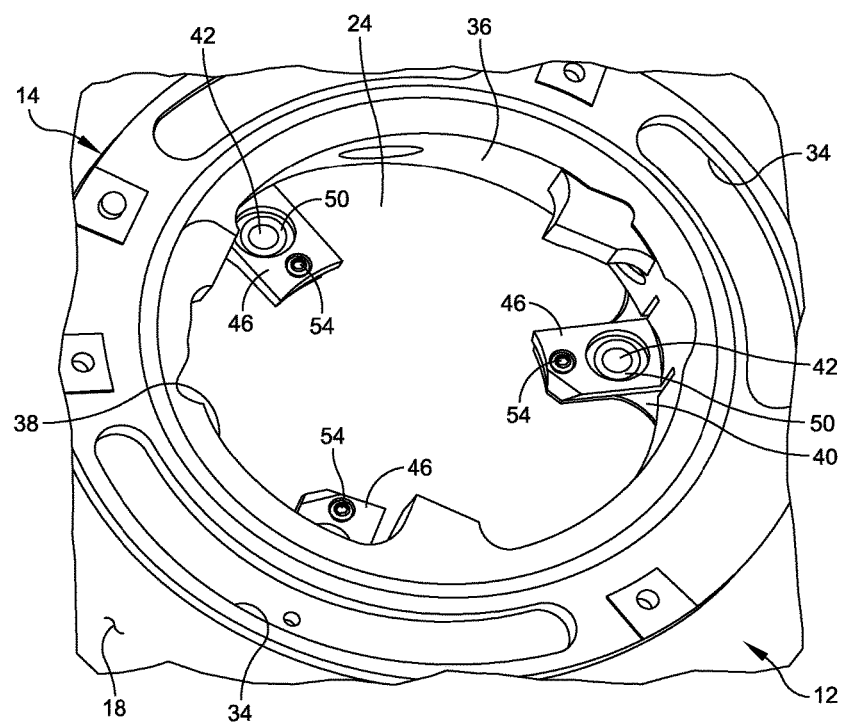
FIG. 4 is an enlarged perspective view of the mounting hub of the primary mirror mount assembly.
Figure 5:
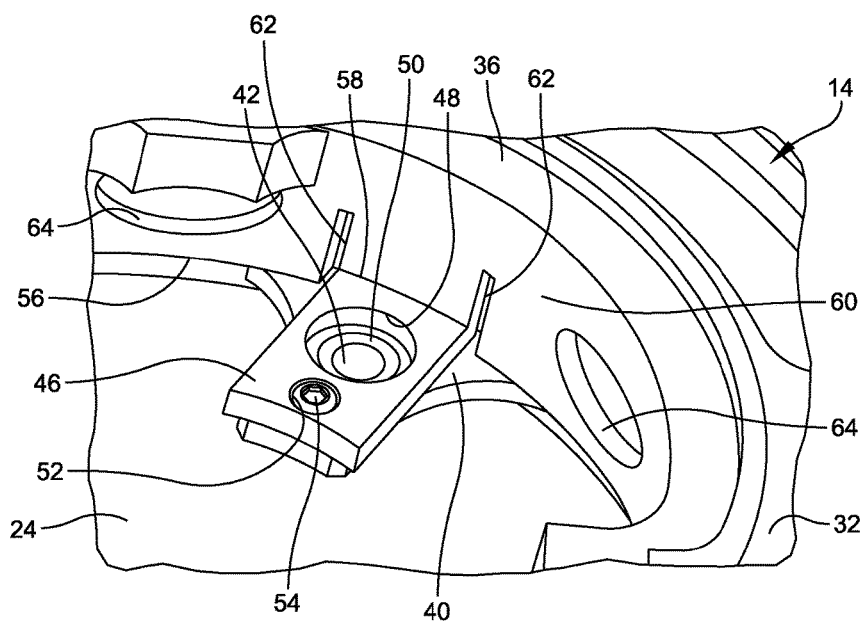
FIGS. 5 and 6 are enlarged perspective views of a tab of the mounting hub.
Figure 6:
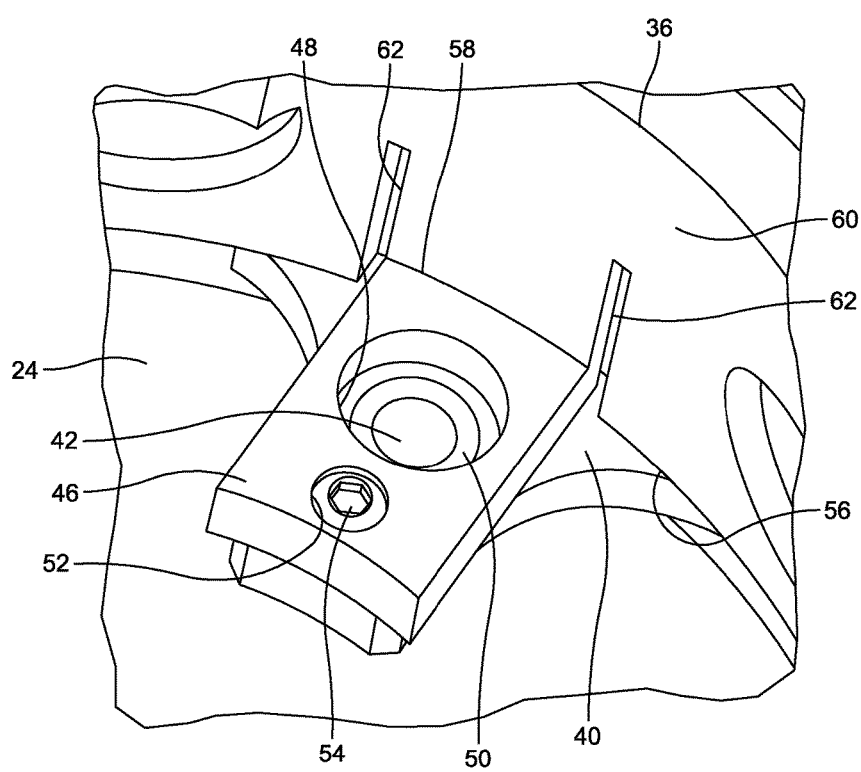

Referring to FIGS. 4-6, each tab 46 of the hub 14 is integrally formed with a lower edge 56 of the inner hub portion 36 of the hub. In one embodiment, the tab 46 is fabricated, e.g., machined at 58, to create the tab. As shown, a wall 60 of the inner hub portion 36 of the hub 14 may include slots, each indicated at 62, to facilitate "tuning" the stiffness of the tab 46 with respect to the inner hub cylinder. The wall 60 of the inner hub portion 36 may also include openings or recesses, each indicated at 64, formed therein to tune parameters such as weight, stiffness or thermal characteristics. The openings 64 formed in the wall 60 serve the same purpose as the slots 34 in the hub flange, which is to control stiffness and reduce weight. The multi-piece design facilitates the tailoring of such key structural features of the hub and blank.

In another embodiment, the opening 48 of the tab 46 that receives the boss 42 and the weld washer 50 therein, is formed as a counterbore in which a diameter of the counterbore is slightly larger than an outer diameter of the weld washer. The larger diameter of the counterbore provides clearance around the circumference of the outer diameter of the weld washer, so that the laser beam can strike the weld washer unvignetted. Since the weld joint is primarily intended to resist shear loads, it is positioned adjacent to the shear plane between the tabs 40 and 46 of the blank 12 and the hub 14, respectively. The positioning of the boss 42 relative to the threaded opening 44 provided on the raised portion 40 of the body 12, and the opening 48 relative to the smaller opening 52 on the tab 46 may be reversed depending on design constraints.

Figure 7:
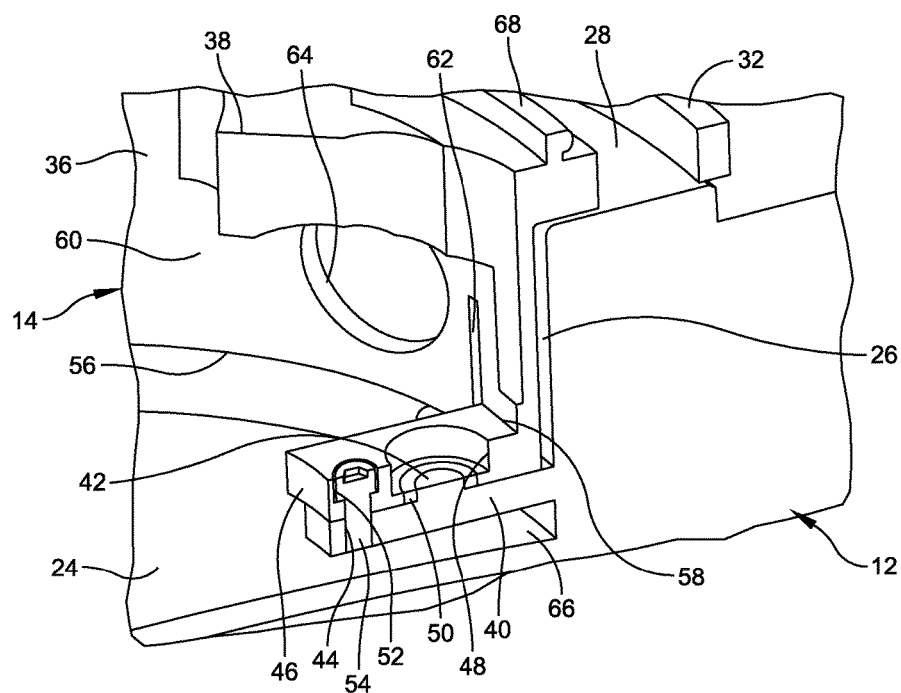
FIGS. 7-9 are cross-sectional views of the tab.
Figure 8:
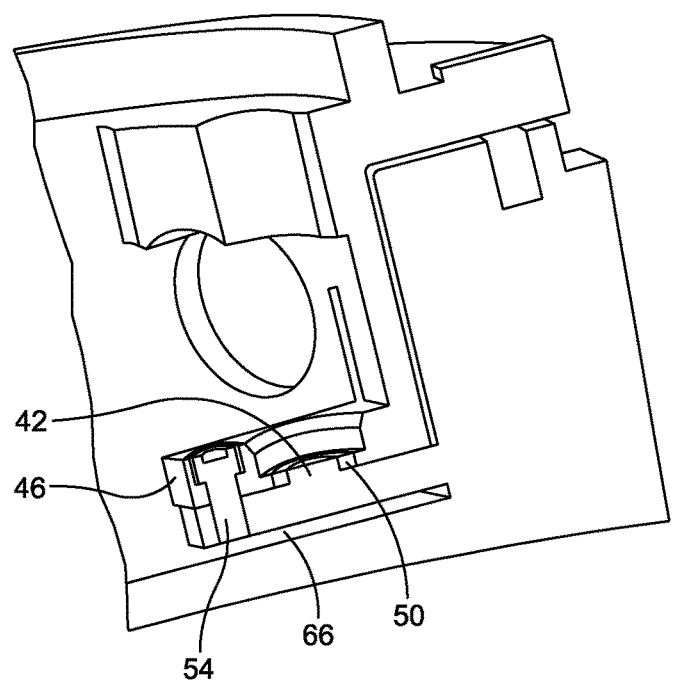
Figure 9:
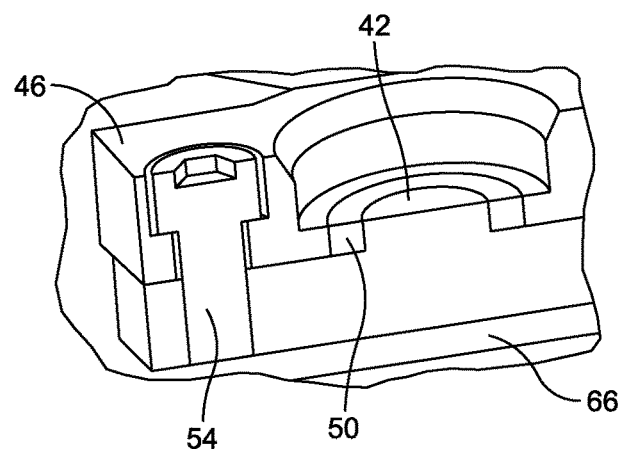

FIGS. 7-9 illustrate the seating of the tab 46 of the hub 14 on its respective boss 42 of the body 12. As shown, the raised portion 40 has a relief 66 formed under the raised portion of the body 12. The relief 66 is provided to attenuate both thermal stress induced during the welding process as well as bolt-up stress from the mating of the hub with the telescope housing. Also shown is a feature 68 provided on the outer rim portion 32 of the hub 14.

Although three mounting features associated with the body 12 and the hub 14 are described herein, it should be understood that any number of mounting features, e.g., two, four or six, may be provided and still fall within the scope of the present disclosure. Also, it should be understood that although the constituent parts of the body 12, hub 14, and fasteners (weld washers 50) are fabricated from the same material, these parts may be fabricated from materials capable of being welded together. Moreover, although laser welding is the preferred technique for welding the tabs 46 to the bosses 42 and the weld washers 50, other techniques, such as electron beam welding (EBW), may be used as well.

In one embodiment, a method of assembling a primary mirror mount assembly 10 includes aligning the features (e.g., three features) formed on the mount surface 18 of the body 12 with the corresponding features (e.g., three features) formed on the hub 14. When aligning the features of the body 12 with the corresponding features of the hub 14, the tabs 46 of the hub are aligned to be disposed over their respective raised portions 40 of the body 12 so that the openings 48 of the tabs are aligned with the bosses 42 of the body. As described herein, the weld washers 50 are provided on the bosses 42 to facilitate the welding process. The hub 14 is positioned within the recess 24 formed in the mount surface 18 of the body 12 so that the tabs 46 are seated firmly in place over their respective bosses 42. The hub 14 is initially secured to the body 12 with the screws 54. In the shown embodiment, the screws 54 are received within their respective openings 48 of the tabs 46 and screwed into their respective threaded openings 44 to firmly secure the hub to the body. Once firmly secured, the hub 14 is welded to the body 12 by welding each tab/boss/weld washer structures. Laser welding may be employed to weld the components to one another. Once welded, additional machining and thermal stress relieving of the primary mirror mount assembly may occur. In addition, the mirror surface 16 of the body 12 can be diamond point turned, polished, or otherwise finished to provide the mirror surface without harming the manner in which the hub 14 is secured to the body.

The primary mirror mount assembly 10 is designed to operate over a broad spectrum of military environments, including temperatures ranging from −40° C. to +71° C. The mount assembly 10 is exposed to both vibration and shock associated with both propeller and jet driven airborne platforms, including the atmospheres typical of altitudes ranging from sea level to 40,000 feet. Throughout combinations of these various environments above, finite element analyses of the design predict, and structural testing of representative laser welded parts, witness that this hardware retains its alignment accuracy and structural rigidity.

Figure 10:
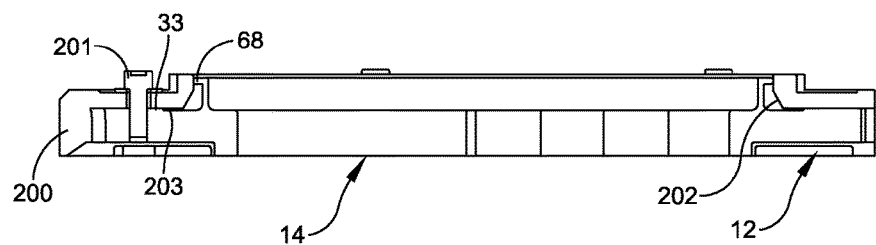
FIG. 10 is a cross-sectional view of the primary mount assembly installed on a typical telescope housing.

FIG. 10 depicts a partial view of the primary mirror mount assembly mated with a telescope housing, indicated at 200. To ensure required alignment stability and structural integrity, threaded fasteners, indicated at 201, axially preload the hub 14 to the housing 12 via the six threaded holes in precision coplanar interface pads, indicated at 33 in FIG. 3. To provide proper rotational orientation of the primary mirror mount assembly with respect to the telescope housing, a dowel pin, indicated at 100 in FIG. 3, mates with a precision slot in the housing.

Important to this embodiment, as depicted in FIG. 10, is the interference mating of a hub interface rim, indicated at 68, with the precision bore, indicated at 202, in the telescope housing 200. An advantage of the multi-piece primary mirror mount assembly 10 is the capability to include structural features, such as the interface rim 68, which purposely interferes with the telescope housing to create a preloaded joint that will not slip radially when exposed to the required inertial shock loads. Not only can the hub 14 provide this preloaded (non-slip) joint, but the design capability to fabricate the hub independently of the mirror blank 12 facilitates configuring the hub to purposely decouple the resultant stresses in this preloaded interface rim from the mirror optical surface 16.

This decoupling is achieved through the selected geometry of the hub 14 and mirror blank 12, to separate a "stressed" rim from the mirror optical surface 16. Incorporating a lengthy circuitous path between the rim 68 and the optical surface 16 serves to attenuate the stress all along the path. Such a complex design configuration is extremely difficult, if not impossible, to fabricate from a single piece of material.

Thus, with the shown embodiment, the screws 54, which may include suitable aluminum fasteners, carry axial loads, with the laser welds only being subjected to shear loads.

In certain embodiments, the primary mirror may be employed with an additional interface to its hub, from a device like a gyro, which adds another housing-to-mirror mount bolted interface. Whether mated to a telescope housing or an additional device is secured to the mirror hub, the mirror surface deformation is dramatically reduced. In one example, where a planarity error of 0.001 inch existed between the mirror hub pads at 32 and the mating telescope housing pads at 203, the predicted mirror face deformation for worst case loading is 0.61 microinches RMS (3.75 microinches peak-to peak displacement) for the entire mirror optical surface. Similarly, for a device housing with a similar planarity error of one thousandth of an inch (0.001") between the mating device housing pads and the mirror hub pads at 38, the predicted mirror face deformation for worst case loading is 0.13 microinches RMS for the entire surface, with 0.84 microinches peak-to-peak.

The multi-piece construction of the mirror blank or body and the hub minimizes mirror surface strain induced during use. The assembly and methods described herein facilitate internal material removal from the body for structural and thermal efficiency, and enables optical mirror support, with the hub, at center of gravity of mirror body itself. The assembly eliminates time-sensitive thermal shrink fit, while providing structural/bolt-up advantages, i.e., avoids potential bolted joint slippage with shock loads. The assembly further eliminates reliance on friction, adhesives, or dissimilar material (steel) fasteners at shear joints, to enhance mirror position stability over all environments. The assembly facilitates decoupling of bolt-up induced axial stresses for large aluminum mirrors, thus potentially eliminating the requirement for diamond point machined interfaces at the mating surfaces on the mirror body and also on the mating telescope or other device interfaces. The assembly further facilitates producible fabrication of multi-part high-performance, i.e., maximized stiffness to weight ratio, aluminum mirrors.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of assembling a primary mirror, the method comprising:
    aligning at least one feature formed on a mount surface of a body with at least one corresponding mating feature formed on a hub;
    positioning the hub within a recess formed in a mount surface of the body so that the at least one feature formed on the body engages the at least one mating feature of the hub;
    welding the at least one feature of the mount surface of the body to the at least one corresponding mating feature of the hub; and
    finishing a mirror surface of the body after welding,
    wherein aligning the at least one feature of the body with the at least one mating feature of the hub further includes aligning a tab of the at least one mating feature with a raised portion of the at least one feature, and
    wherein aligning the at least one feature of the body with the at least one mating feature of the hub further includes aligning an opening of the tab of the at least one mating feature with a boss formed on the raised portion of the at least one feature.

2. The method of claim 1, further comprising positioning a weld washer around the boss prior to welding the at least one feature of the mount surface of the body to the at least one corresponding mating feature of the hub.

3. The method of claim 1, further comprising initially securing the hub to the body with a screw.

4. The method of claim 1, further comprising forming a relief under the raised portion of the at least one feature.

5. The method of claim 1, wherein welding the at least one feature of the body to the at least one corresponding mating feature of the hub includes laser welding.

6. A method of assembling a primary mirror, the method comprising:
    aligning at least one feature formed on a mount surface of an aluminum body with at least one corresponding mating feature formed on an aluminum hub;
    positioning the hub and an aluminum weld washer within a recess formed in a mount surface of the aluminum body so that the at least one feature formed on the aluminum body engages the at least one mating feature of the hub;
    laser welding the at least one feature of the mount surface of the aluminum body to the at least one corresponding mating feature of the hub; and
    finishing a mirror surface of the aluminum body after welding.

7. The method of claim 6, wherein the recess is formed as counterbore having a diameter that is slightly larger than an outer diameter of the aluminum weld washer.

* * * * *